United States Patent
Swann et al.

[11] Patent Number: 6,010,152
[45] Date of Patent: Jan. 4, 2000

[54] AIR BAG INFLATOR

[75] Inventors: Timothy A. Swann; Bryan W. Shirk, both of Mesa; Dean M. Esterberg, Tempe; Ahmad K. Al-Amin, Higley; Roy D. Van Wynsberghe, Mesa; Vincent J. Mramor, Gilbert, all of Ariz.

[73] Assignee: TRW Inc., Lyndhurst, Ohio

[21] Appl. No.: 09/052,414

[22] Filed: Mar. 31, 1998

[51] Int. Cl.$^7$ ............................ B60R 21/26; B60R 21/28
[52] U.S. Cl. ............................................. 280/736; 280/741
[58] Field of Search .................................. 280/736, 737, 280/740, 741, 742, 743.1

[56] References Cited

U.S. PATENT DOCUMENTS

| 5,271,525 | 12/1993 | Petrie . | |
|---|---|---|---|
| 5,470,104 | 11/1995 | Smith et al. | 280/737 |
| 5,558,367 | 9/1996 | Cuevas . | |
| 5,564,740 | 10/1996 | Zakula . | |
| 5,564,743 | 10/1996 | Marchant . | |
| 5,566,976 | 10/1996 | Cuevas . | |
| 5,582,428 | 12/1996 | Buchanan et al. | 280/741 |
| 5,685,558 | 11/1997 | Cuevas . | |
| 5,857,699 | 1/1999 | Rink et al. | 280/737 |
| 5,863,066 | 1/1999 | Blumenthal | 280/737 |

Primary Examiner—Lanna Mai
Assistant Examiner—Faye M. Fleming
Attorney, Agent, or Firm—Tarolli, Sundheim, Covell, Tummino & Szabo L.L.P.

[57] ABSTRACT

An apparatus (10) for inflating an inflatable vehicle occupant protection device (36) includes a container (12) defining a chamber (14) for storing a quantity of inflation fluid (78) under pressure. First and second outlet passages (60, 62) in the container (12) can each direct flow of fluid (78) out of the chamber (14) to the inflatable device (36) for inflating the inflatable device. The first outlet passage (60) has a first flow area. The second outlet passage (62) has a second flow area less than the flow area of the first outlet passage (60). A first burst disk (70) on the container (12) blocks the first outlet passage (60). A second burst disk (72) on the container (12) blocks the second outlet passage (62). The apparatus (10) includes means (80) for rupturing the first burst disk (70) to direct flow of fluid out of the chamber (14) through the first outlet passage (60) without rupturing the second burst disk (72). The apparatus (10) also includes means (82) for rupturing the second burst disk to direct flow of fluid out of the chamber through the second outlet passage (62) without rupturing the first burst disk.

9 Claims, 2 Drawing Sheets

AIR BAG INFLATOR

BACKGROUND OF THE INVENTION

1. Technical Field

The present invention relates to an apparatus for inflating an inflatable vehicle occupant protection device. In particular, the present invention relates to an air bag inflator including a gas storage chamber having plural outlet passages covered by separate burst disks.

2. Description of the Prior Art

Known air bag inflators include inflation fluid stored under pressure in a chamber in a container. A burst disk blocks flow of inflation fluid from the chamber. An initiator is actuatable to rupture the burst disk. Some inflators have two burst disks covering two outlet passages in a container. The burst disks can be ruptured simultaneously, or at separate times, to control the rate and volume of fluid flow from the inflator.

SUMMARY OF THE INVENTION

The present invention is an apparatus for inflating an inflatable vehicle occupant protection device. The apparatus comprises a container defining a chamber for storing a quantity of inflation fluid under pressure. The apparatus includes first and second outlet passages in the container for directing flow of fluid out of the chamber to the inflatable device for inflating the inflatable device. The first outlet passage has a first flow area. The second outlet passage has a second flow area less than the first flow area of the first outlet passage. A first burst disk on the container blocks the first outlet passage. A second burst disk on the container blocks the second outlet passage. The apparatus includes means for rupturing the first burst disk to direct flow of fluid out of the chamber through the first outlet passage without rupturing the second burst disk, and means for rupturing the second burst disk to direct flow of fluid out of the chamber through the second outlet passage without rupturing the first burst disk.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF A PREFERRED EMBODIMENT

Figure 1:
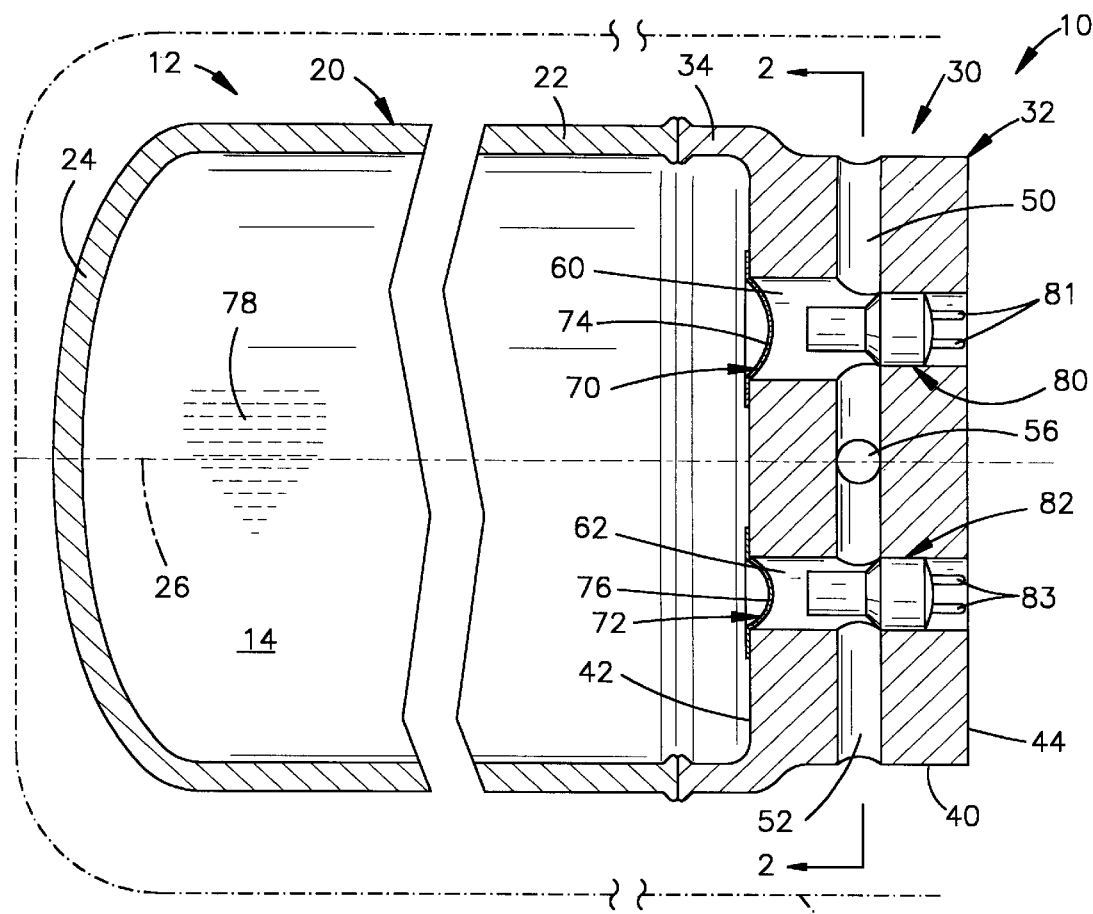
FIG. 1 is a longitudinal sectional view of an air bag inflator constructed in accordance with a first embodiment of the present invention.
Figure 2:
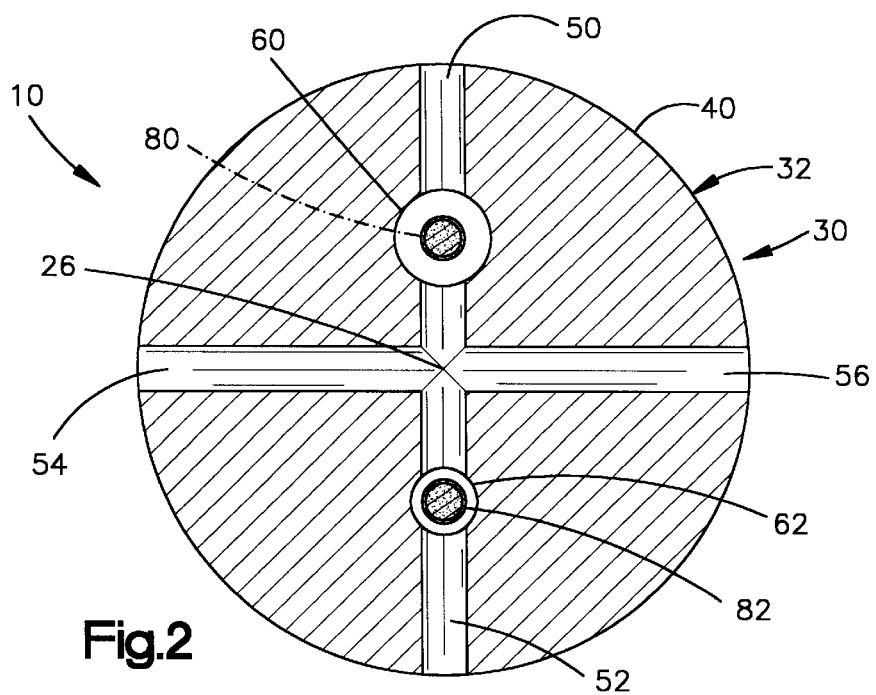
FIG. 2 is a sectional view through a diffuser of the inflator of FIG. 1, taken generally along line 2—2 of FIG. 1.

The present invention relates to an apparatus for inflating an inflatable vehicle occupant protection device. In particular, the present invention relates to an air bag inflator having plural fluid outlet passages each covered by a separate burst disk. As representative of the present invention, FIG. 1 illustrates an inflator 10.

The inflator 10 includes a container 12 which defines a gas storage chamber 14. The container 12 has a main body portion 20. The main body portion 20 of the container 12 has a generally cylindrical configuration including a cylindrical, axially extending side wall 22 and a curved, generally radially extending end wall 24. The side wall 22 of the container 12 is centered on a longitudinal central axis 26 of the inflator 10.

The container 12 also includes a diffuser 30. The diffuser 30 has a main body portion 32 and a flange portion 34. The flange portion 34 of the diffuser 30 is welded to the side wall 22 of the container 12. The diffuser 30 closes the end of the container 12 opposite the end wall 24. The diffuser 30 is in fluid communication with an inflatable vehicle occupant protection device in the form of an air bag indicated schematically at 36.

The main body portion 32 of the diffuser 30 has a generally disc-shaped configuration including a cylindrical outer side surface 40 extending axially between parallel, radially extending inner and outer end surfaces 42 and 44. Four diffuser ports 50, 52, 54 and 56 are formed in the main body portion 32 of the diffuser 30. The diffuser ports 50–56 are cylindrical passages which extend radially outward from the axis 26 to the cylindrical outer surface 40 of the main body portion 32 of the diffuser 30.

The diffuser ports 50–56 all lie in the same plane. The ports 50 and 52 extend diametrically opposite each other from the axis 26. The diffuser ports 54 and 56 extend diametrically opposite each other from the axis 26, in a direction perpendicular to the ports 50 and 52. The four diffuser ports 50–56 intersect at the axis 26 and thus are in fluid communication with each other.

First and second outlet passages 60 and 62 are formed in the main body portion 32 of the diffuser 30. The outlet passages 60 and 62 are spaced apart from each other on opposite sides of the axis 26. The outlet passages 60 and 62 are cylindrical passages which extend axially from the inner end surface 42 of the main body portion 32 of the diffuser 30 to the diffuser ports 50 and 52, respectively.

The first outlet passage 60 intersects the diffuser port 50. The first outlet passage 60 thus establishes fluid communication between the chamber 14 and the diffuser port 50. The second outlet passage 62 intersects the diffuser port 52. The second outlet passage 62 thus establishes fluid communication between the chamber 14 and the diffuser port 52. Because the four diffuser ports 50–56 are in fluid communication with each other, each one of the outlet passages 60 and 62 is in fluid communication with the four diffuser ports.

The diameter of the first outlet passage 60 is greater than the diameter of the second outlet passage 62. As a result, the flow area of the first outlet passage 60 is greater than the flow area of the second outlet passage 62.

A first burst disk 70 is welded to the inner side surface 42 of the main body portion 32 of the diffuser 30. The first burst disk 70 has a circular configuration and extends across the first outlet passage 60. The first burst disk 70 blocks fluid flow through the first outlet passage 60.

A second burst disk 72 is welded to the inner side surface 42 of the main body portion 32 of the diffuser 30. The second burst disk 72 has a circular configuration and extends across the second outlet passage 62. The second burst disk 72 blocks fluid flow through the second outlet passage 62. Because the diameter of the first outlet passage 60 is greater than the diameter of the second outlet passage 62, the first burst disk 70 is larger in diameter than the second burst disk 72.

A quantity of inflation fluid 78 is stored under pressure in the chamber 14. The inflation fluid 78 preferably comprises an inert gas, such as argon or helium, under pressure. The inflation fluid 78 is stored at a pressure in the range of about 1,500 psig to about 10,000 psig. The first and second burst disks 70 and 72 have inner side surfaces 74 and 76, respectively, which are exposed to the pressure of the inflation fluid 78 when the first and second burst disks are unruptured. The burst disks 70 and 72 could, alternatively, be formed in one piece with the diffuser 30, as thin-walled sections of the diffuser, for example.

The inflation fluid 78 may alternatively comprise a combustible mixture of gases including a primary gas and a fuel gas. The primary gas comprises the majority of the inflation fluid that inflates the air bag. The fuel gas, when ignited, heats the primary gas to increase the pressure and temperature of the fluid in the chamber.

The inflator includes means for rupturing the first burst disk 70 to enable flow of inflation fluid 78 out of the chamber 14 through the first outlet passage 60. In the illustrated embodiment, the means for rupturing the first burst disk 70 comprises an electrically actuatable first initiator 80. The initiator 80 is a known device such as a pyrotechnic squib which, when electrically energized, produces combustion products for rupturing the first burst disk 70. The first initiator 80 is disposed at least partially in the first outlet passage 60. The first initiator 80 includes a pair of electrical terminals 81 for receiving an electric current to energize the second initiator.

The inflator 10 also includes means for rupturing the second burst disk 72 to enable flow of inflation fluid 78 out of the chamber 14 through the second outlet passage 62. In the illustrated embodiment, the means for rupturing the second burst disk 72 comprises an electrically actuatable second initiator 82. The second initiator 82 is a known device such as a pyrotechnic squib which, when electrically energized, produces combustion products for rupturing the second burst disk 72. The second initiator 82 preferably has the same construction as the first initiator 80.

The second initiator 82 is disposed at least partially in the second outlet passage 72. The second initiator 82 includes a pair of electrical terminals 83 for receiving an electric energizing current to energize the second initiator. The second initiator 82 is energizable independently of the first initiator 80, that is, at the same time, at a different time, or not at all, depending on the vehicle circuitry which controls actuation of the two initiators.

The terminals 81 and 83 of the first and second initiators 80 and 82 are connected with vehicle electric circuitry (not shown) including a power source, which is preferably a vehicle battery and/or a capacitor, and a normally open switch. The switch is part of a sensor which senses a vehicle condition indicating the occurrence of a collision. The collision-indicating condition may comprise, for example, sudden vehicle deceleration that is caused by a collision. If the collision-indicating condition is at or above a predetermined threshold level, it indicates the occurrence of a collision having at least a predetermined threshold level of severity. The threshold level of collision severity is a level at which inflation of the air bag or other vehicle occupant protection device is desired to help protect an occupant of the vehicle.

When the sensor senses a collision-indicating condition at or above the predetermined threshold level, the switch closes and the first initiator 80 is energized electrically. The first initiator 80 produces hot combustion products which pressurize the first outlet passage 60 and rupture the first burst disc 70.

Inflation fluid 78 flows out of the chamber 14, through the first outlet passage 60 in the diffuser 30. The inflation fluid 78 flows from the first outlet passage 60 into the diffuser port 50 and thence into the other diffuser ports 52–56. The inflation fluid 78 is directed by the diffuser ports 50–56 into the air bag 36 to inflate the air bag.

The vehicle electric circuitry might, in a known manner, electrically energize the second initiator 82 as well as the first initiator 80, either at the same time as the first initiator or shortly thereafter. If the second initiator 82 is electrically energized, its combustion products rupture the second burst disc 72, enabling flow of inflation fluid 78 out of the chamber 14 through the second outlet passage 62. Because the flow area of the second outlet passage 62 is less than the flow area of the first outlet passage 60, the rate of fluid flow through the second outlet passage is less than the rate of fluid flow through the first outlet passage.

The vehicle electric circuitry is operable, in a known manner, to energize either or both of the initiators 80 and 82, simultaneously or at a time interval. It is thus possible to tailor the overall rate of fluid flow into the air bag 36 by controlling whether one or both initiators 80 and 82 are energized, which initiator is fired first, and the timing of the firing of the two initiators.

Figure 3:
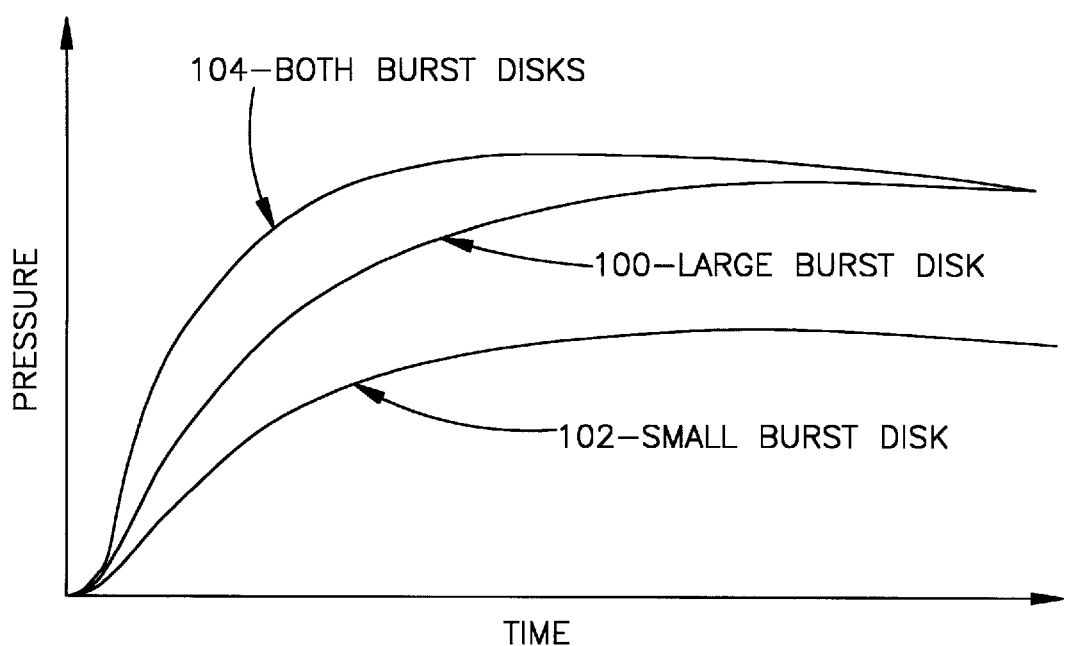
FIG. 3 is a graph showing output pressure of the inflator of FIG. 1 as a function of time.

For example, the curve 100 (also labeled "large burst disk") in FIG. 3 represents output pressure of the inflator 10 as a function of time, in the case when only the first initiator 80 is actuated and only the first burst disk 70 is ruptured. The first outlet passage 60 forms the only fluid outlet path for the inflation fluid 78 in the chamber 14. The relatively large diameter of the first outlet passage 60 (compared to the diameter of the second outlet passage 62) provides a relatively steep output curve and a relatively high peak pressure.

The curve 102 (also labeled "small burst disk") in FIG. 3 represents output pressure of the inflator 10 as a function of time, in the case when only the second initiator 82 is actuated and only the second burst disk 72 is ruptured. The second outlet passage 62 forms the only fluid outlet path for the inflation fluid 78 in the chamber 14. The relatively small diameter of the second outlet passage 62 (compared to the diameter of the first outlet passage 60) provides a relatively shallow output curve and a relatively low peak pressure.

The curve 104 (also labeled "both burst disks") in FIG. 3 represents output pressure of the inflator 10 as a function of time, in the case when both the first and second initiators 80 and 82 are actuated and both the first and second burst disks 70 and 72 are ruptured at the same time. The fluid outlet path for the inflation fluid 78 in the chamber 14 includes both the first outlet passage 60 and the second outlet passage 62. The greater combined flow area of the first and second outlet passages 60 and 62 provides a steeper output curve, and a higher peak pressure, than for either of the first and second burst outlet passages 60 and 62 alone.

Figure 4:
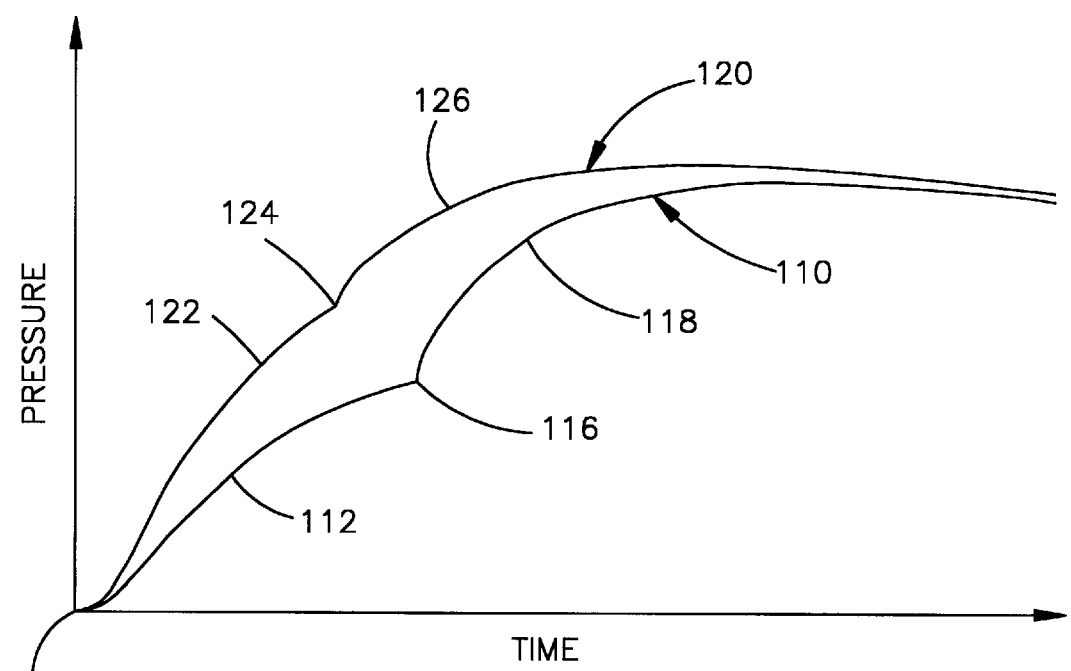
FIG. 4 is a graph similar to FIG. 3 showing output pressure of the inflator of FIG. 1 as a function of time with the inflator actuated in a different manner.

FIG. 4 is a graph similar to FIG. 3 showing output pressure of the inflator of FIG. 1 when both burst disks 70 and 72 are ruptured but at different times. The lower curve labeled 110 in FIG. 4 has a first portion 112 extending from the origin 114 to the point labeled 116, and a second portion 118 extending out from the point 116. The first portion 112 of the lower curve 110 represents output pressure of the inflator 10 as a function of time, when only the smaller second burst disk 72 is ruptured. The second portion 118 of the lower curve 110 represents output pressure of the inflator 10 as a function of time, after the larger first burst disk 70 is, additionally, ruptured. In the curve 110, the overall pressure versus time curve starts rather shallowly, providing "soft" inflation of the air bag 36, then steepens after a predetermined period of time.

The upper curve labeled 120 in FIG. 4 has a first portion 122 extending from the origin 114 to the point labeled 124, and a second portion 126 extending out from the point labeled 124. The first portion 122 of the upper curve 120 represents output pressure of the inflator 10 as a function of time, when only the larger first burst disk 70 is ruptured. The second portion 126 of the upper curve 120 represents output pressure of the inflator 10 as a function of time, after the smaller second burst disk 72 is, additionally, ruptured.

In inflators constructed in accordance with the present invention, the flow area of each of the outlet passages 60 and 62 is a function of its diameter. It is believed that typical ratios of the diameter of the larger outlet passage 60 to the diameter of the smaller outlet passage 62 can be in the range of about 1:1 to about 5:1. Typical ratios of the diameter of the larger outlet passage 60 to the combined diameters of the four diffuser ports 50–56 can be in the range of about 0.5:1 to about 1:7.

Typical ratios of the diameter of the smaller outlet passage 62 to the combined diameters of the four diffuser ports 50–56 can be in the range of about 0.5:1 to about 1:10. Typical ratios of the combined diameters of the two outlet passages 60 and 22 to the combined diameters of the four diffuser ports 50–56 can be in the range of about 1:1 to about 1:2. Of course, these dimensions are not intended to be limiting of the scope of the present invention, but only illustrative.

From the above description of the invention, those skilled in the art will perceive improvements, changes and modifications of the invention. For example, the inflator can include detonators attached to the burst disks, instead of initiators spaced apart from the burst disks, or movable needles or projectiles can be used. Such improvements, changes and modifications within the skill of the art are intended to be covered by the appended claims.

Having described the invention, we claim:

1. An apparatus for inflating an inflatable vehicle occupant protection device, said apparatus comprising:

a container defining a chamber for storing a quantity of inflation fluid under pressure;

first and second outlet passages in said container, each of said first and second outlet passages being for directing flow of fluid out of said chamber to the inflatable device for inflating the inflatable device;

said first outlet passage having a first flow area, said second outlet passage having a second flow area less than said first flow area of said first outlet passage;

a first burst disk on said container and blocking said first outlet passage;

a second burst disk on said container and blocking said second outlet passage;

means for rupturing said first burst disk to direct flow of fluid out of said chamber through said first outlet passage without rupturing said second burst disk; and means for rupturing said second burst disk to direct flow of fluid out of said chamber through said second outlet passage without rupturing said first burst disk.

2. An apparatus as set forth in claim 1 wherein each one of said first and second burst disks has a respective inner side surface which is exposed to the pressure of inflation fluid in said chamber when said first and second burst disks are unruptured.

3. An apparatus as set forth in claim 1 wherein said container comprises a diffuser including said first and second outlet passages, said diffuser further including diffuser ports for directing flow of fluid from said first and second outlet passages to the inflatable device, said first outlet passage and said diffuser ports defining a first fluid flow path between said chamber and the inflatable device, said second outlet passage and said diffuser ports defining a second fluid flow path between said chamber and the inflatable device.

4. An apparatus as set forth in claim 3 wherein said first and second outlet passages are cylindrical passages which extend between said chamber and said diffuser ports, and wherein the diameter of said first outlet passage is greater than the diameter of said second outlet passage.

5. An apparatus as set forth in claim 4 wherein each one of said first and second burst disks has a circular configuration, said first burst disk being larger in diameter than said second burst disk.

6. An apparatus as set forth in claim 3 wherein all of said diffuser ports in said diffuser are in fluid communication with each other.

7. An apparatus as set forth in claim 1 further comprising vehicle electric circuitry operable to actuate either (i) said means for rupturing said first burst disk or said (ii) said means for rupturing said second burst disk or (iii) both of said means for rupturing said burst disks.

8. An apparatus as set forth in claim 1 wherein said means for rupturing said first burst disk comprises an electrically actuatable initiator.

9. An apparatus as set forth in claim 1 wherein said means for rupturing said first burst disk is disposed at least partially in said first outlet passage and said means for rupturing said second burst disk is disposed at least partially in said second outlet passage.

* * * * *